(12) United States Patent
Leber et al.

(10) Patent No.: US 11,971,100 B2
(45) Date of Patent: Apr. 30, 2024

(54) SYSTEMS FOR TRANSMISSION COVER FOR SUPPORTING A SHIFT FORK

(71) Applicant: Dana Heavy Vehicle Systems Group, LLC, Maumee, OH (US)

(72) Inventors: Mark W. Leber, Holland, OH (US); Justin Hall, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/808,061

(22) Filed: Jun. 21, 2022

(65) Prior Publication Data
US 2023/0407964 A1 Dec. 21, 2023

(51) Int. Cl.
*F16H 63/32* (2006.01)
*F16H 57/031* (2012.01)
*F16H 63/30* (2006.01)

(52) U.S. Cl.
CPC ........... *F16H 63/32* (2013.01); *F16H 57/031* (2013.01); *F16H 2063/3089* (2013.01); *F16H 2063/321* (2013.01)

(58) Field of Classification Search
CPC ............. F16H 2063/325; F16H 57/021; F16H 57/031; F16H 2057/0216; F16H 2057/0224; F16H 2063/321
See application file for complete search history.

(56) References Cited

U.S. PATENT DOCUMENTS

| 1,918,167 A * | 7/1933 | Woolson .................... F16H 3/04 74/606 R |
| 2,054,222 A * | 9/1936 | Lapsley .................. F16D 41/08 74/343 |
| 4,793,202 A * | 12/1988 | Okubo ..................... F16H 3/091 74/606 R |
| 5,487,318 A * | 1/1996 | Schott ..................... F16H 59/70 74/606 R |
| 7,854,274 B2 | 12/2010 | Trautner et al. |
| 10,982,765 B2 | 4/2021 | Maki |
| 2002/0139222 A1* | 10/2002 | Blanchard ............... F16H 63/30 74/606 R |
| 2015/0090062 A1* | 4/2015 | Norita ..................... F16H 63/18 74/473.37 |
| 2020/0248794 A1* | 8/2020 | Groetzinger ............ F16H 63/32 |
| 2022/0307583 A1* | 9/2022 | Hisai ......................... F16H 1/46 |

FOREIGN PATENT DOCUMENTS

| CN | 205136578 U | 4/2016 |
| CN | 206753740 U | 12/2017 |
| DE | 102010048343 A1 | 4/2012 |

OTHER PUBLICATIONS

Leber, M. et al., "Systems for Transmission," U.S. Appl. No. 17/654,044, filed Mar. 8, 2022, 20 pages.

* cited by examiner

*Primary Examiner* — Charles A Fox
*Assistant Examiner* — Gregory T Prather
(74) *Attorney, Agent, or Firm* — McCoy Russell LLP

(57) ABSTRACT

Methods and systems are provided for a transmission housing of a vehicle. In one example, a system comprises a transmission housing comprising at least one cover configured to support a shift fork and press the shift fork toward a position sensor corresponding thereto, wherein the at least one cover is removable from an exterior of the transmission housing and comprises a spring to press against the shift fork.

18 Claims, 8 Drawing Sheets

SYSTEMS FOR TRANSMISSION COVER FOR SUPPORTING A SHIFT FORK

FIELD

The present description relates generally to systems for a transmission of an electrified vehicle.

BACKGROUND AND SUMMARY

Vehicles may include a transmission for a controlling power generated by the engine. The transmission may include one or more shafts and gears which may engage or disengage with one another based on a selected gear ratio. One mechanism for engaging and disengaging gears with a shaft is a shift fork.

The shift fork may include a shift linkage configured to mitigate slop/play via the elimination of joints. This may result in a larger fork. Assembly of the larger fork may be more difficult relative to smaller forks due to need for the larger fork to be assembled in the transmission housing at the same time.

In one example, the issues described above may be addressed by a system including a transmission housing and at least one cover configured to support a shift fork, wherein the at least one cover comprises at least one spring and at least one washer inserted into a protrusion of the at least one cover and pressing against an extreme end of the shift fork. In this way, the shift fork may be pressed toward a corresponding position sensor, which may enhance an accuracy of the position sensor.

The cover may include at least one bushing configured to support a first pivot point of a shaft of the shift fork. A second cover may be coupled to the housing and configured to support a second pivot point of the shaft of the shift fork via another bushing. In one example, the inner and outer diameters of the bushings may be different to promote a desired orientation of the shift fork within the transmission housing. The second pivot point may be at an extreme end of the shift fork opposite the first pivot point. The covers may be configured to support additional shift forks via additional bushings. In one example, the covers are configured to support two shift forks, oriented in opposite directions one another. The covers may be positioned at cut-outs of the housing, wherein the cut-outs may be positioned to allow the shift fork(s) to be positioned within the housing as a single piece. By doing this, a complexity of assembly of the transmission housing with the shift forks may be reduced, while reducing the slop/play in the system described above.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
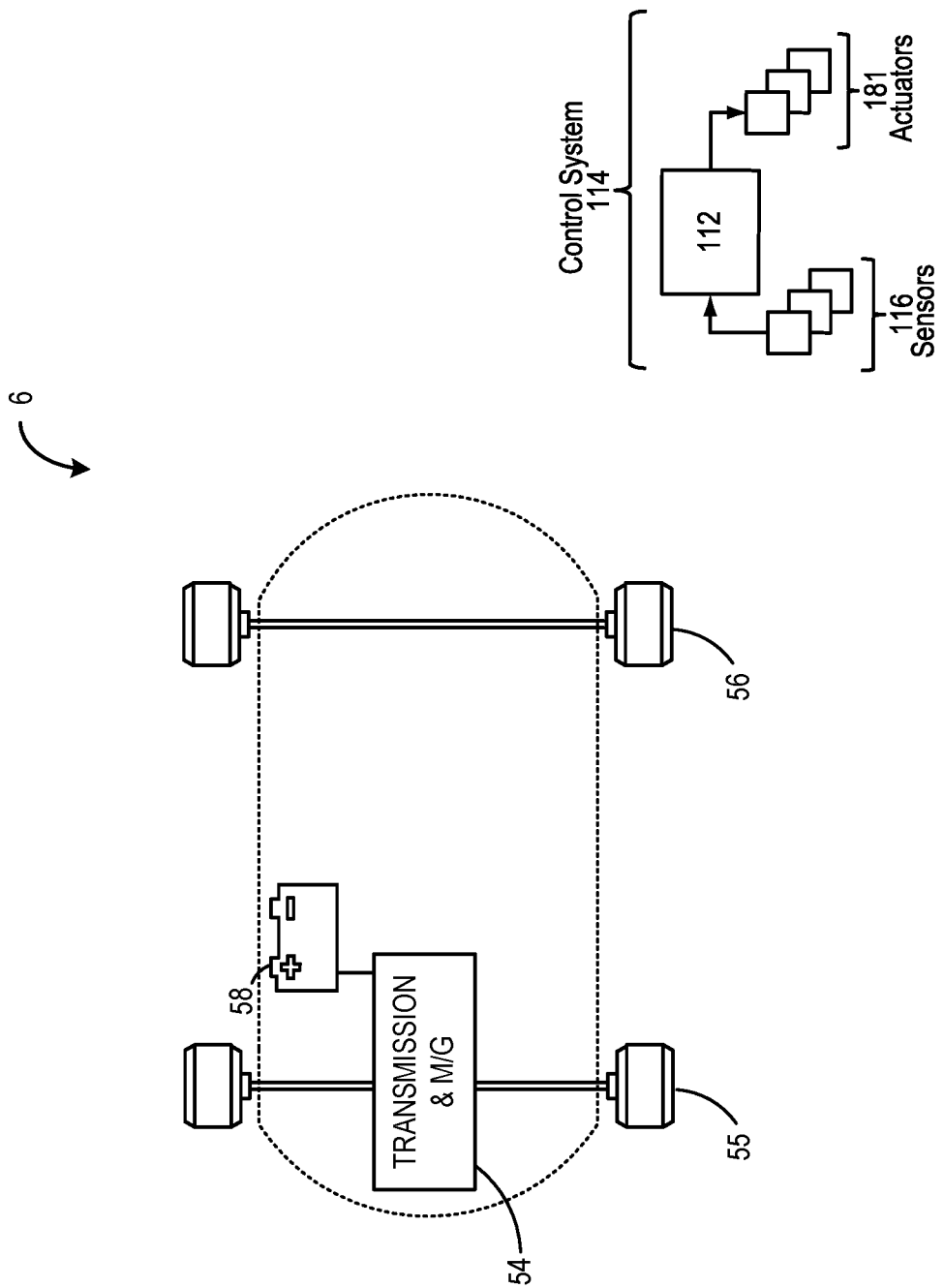
FIG. 1 shows an example of a vehicle system.
Figure 2A:
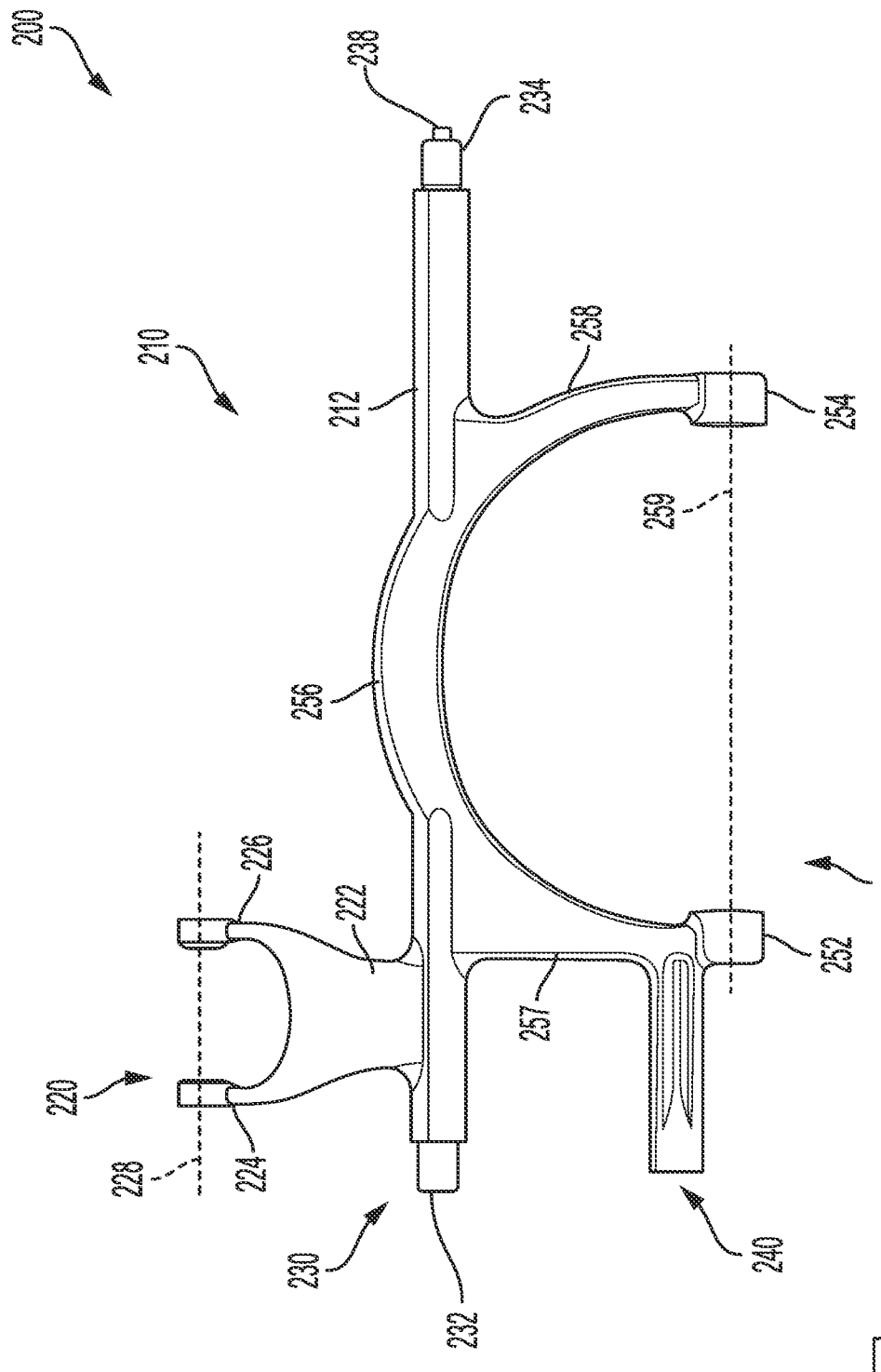
FIG. 2A shows a schematic of a fork.
Figure 2B:
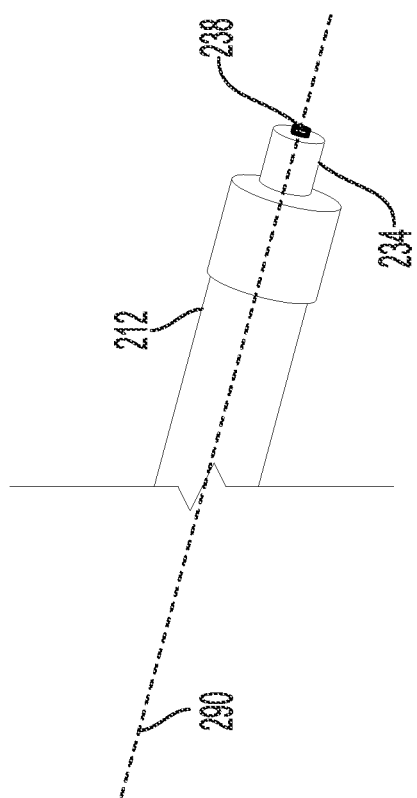
FIG. 2B shows a view of a fork detailing a tip of a pivot point at a second extreme end of a tubular section.
Figure 2B:
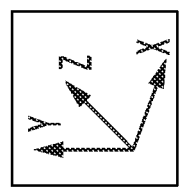
Figure 3:
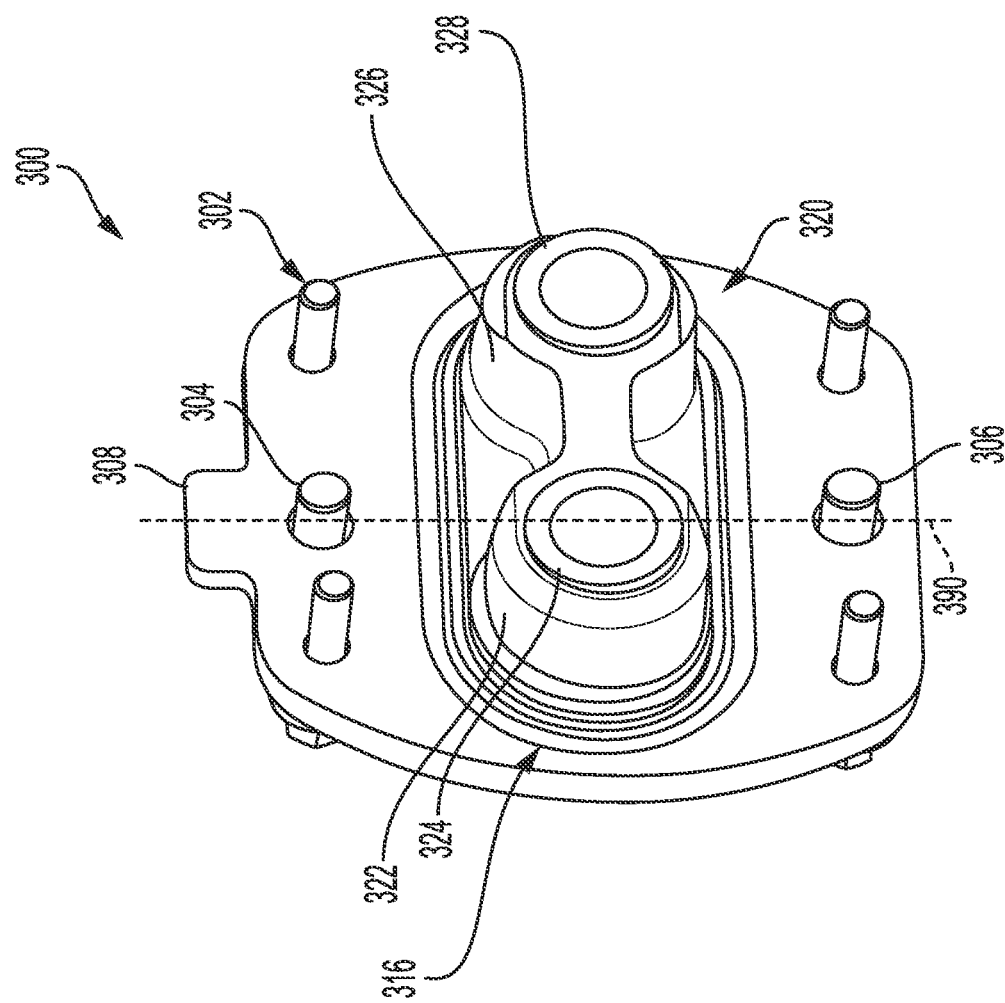
FIG. 3 shows a cover with bushing arranged therein and configured to mate with a transmission housing and the fork.
Figure 3:
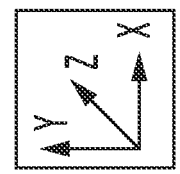
Figure 4:
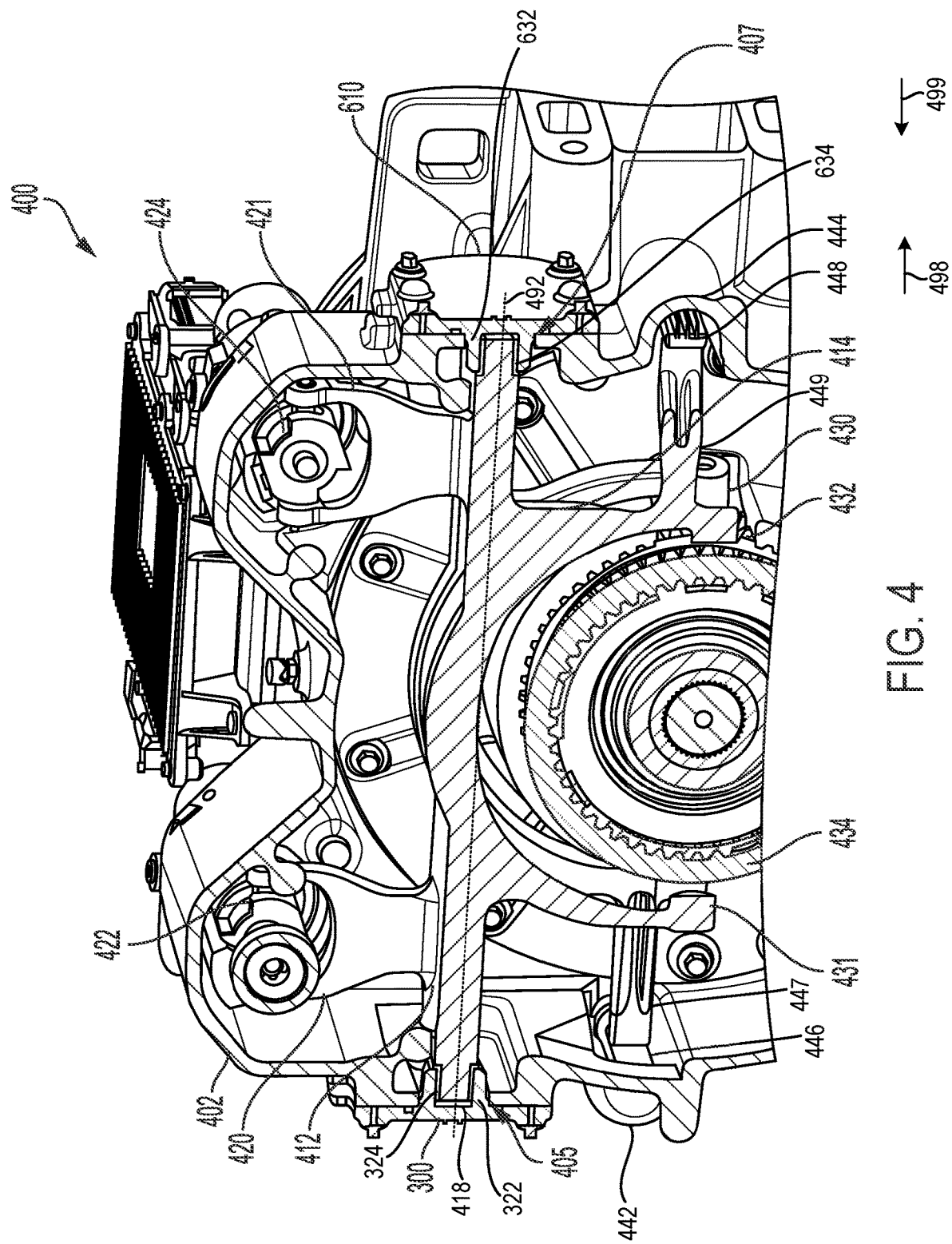
FIG. 4 shows a section view of the fork arranged in the transmission housing and coupled to the cover.
Figure 5:
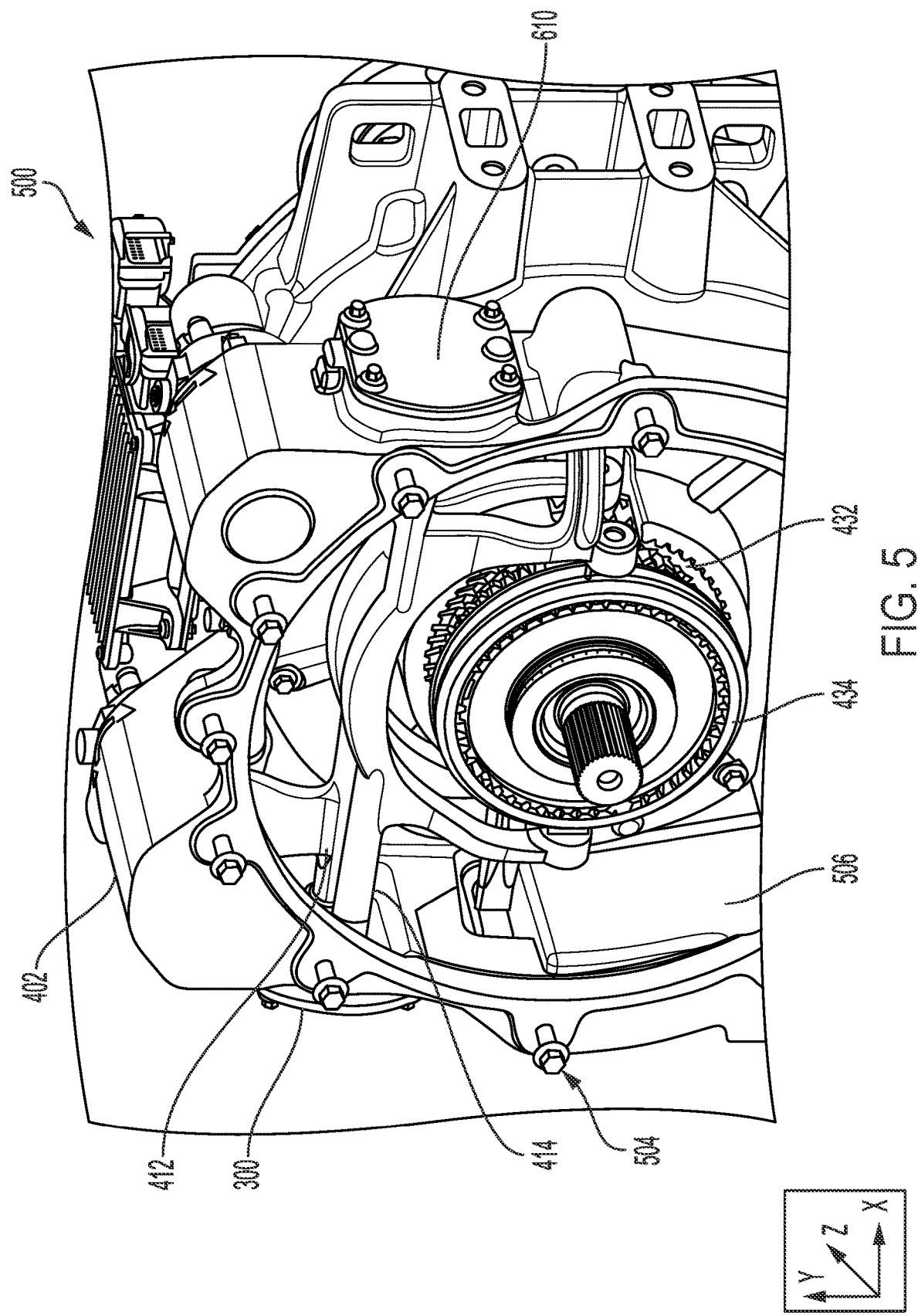
FIG. 5 shows an isometric view of the assembly.
Figure 6A:
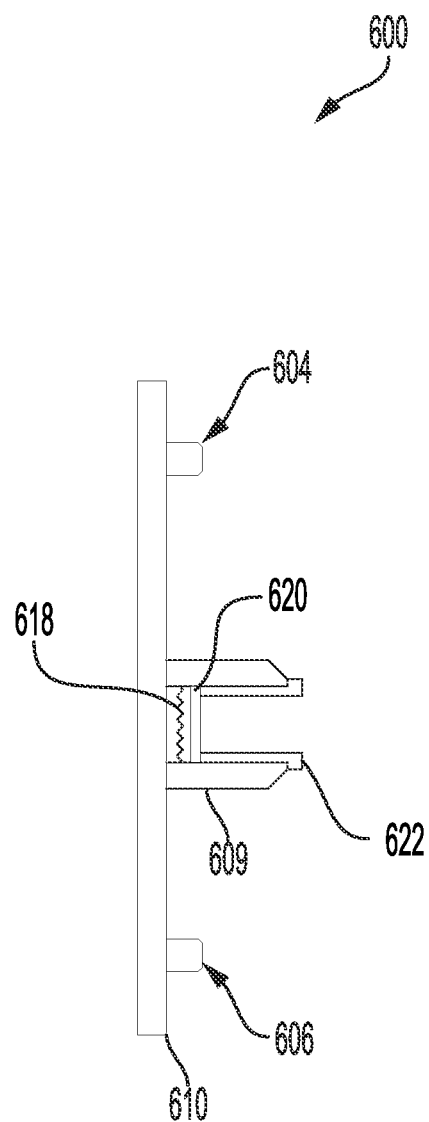
FIG. 6A shows a side view of the cover including a bushing, a washer, and a spring.
Figure 6B:
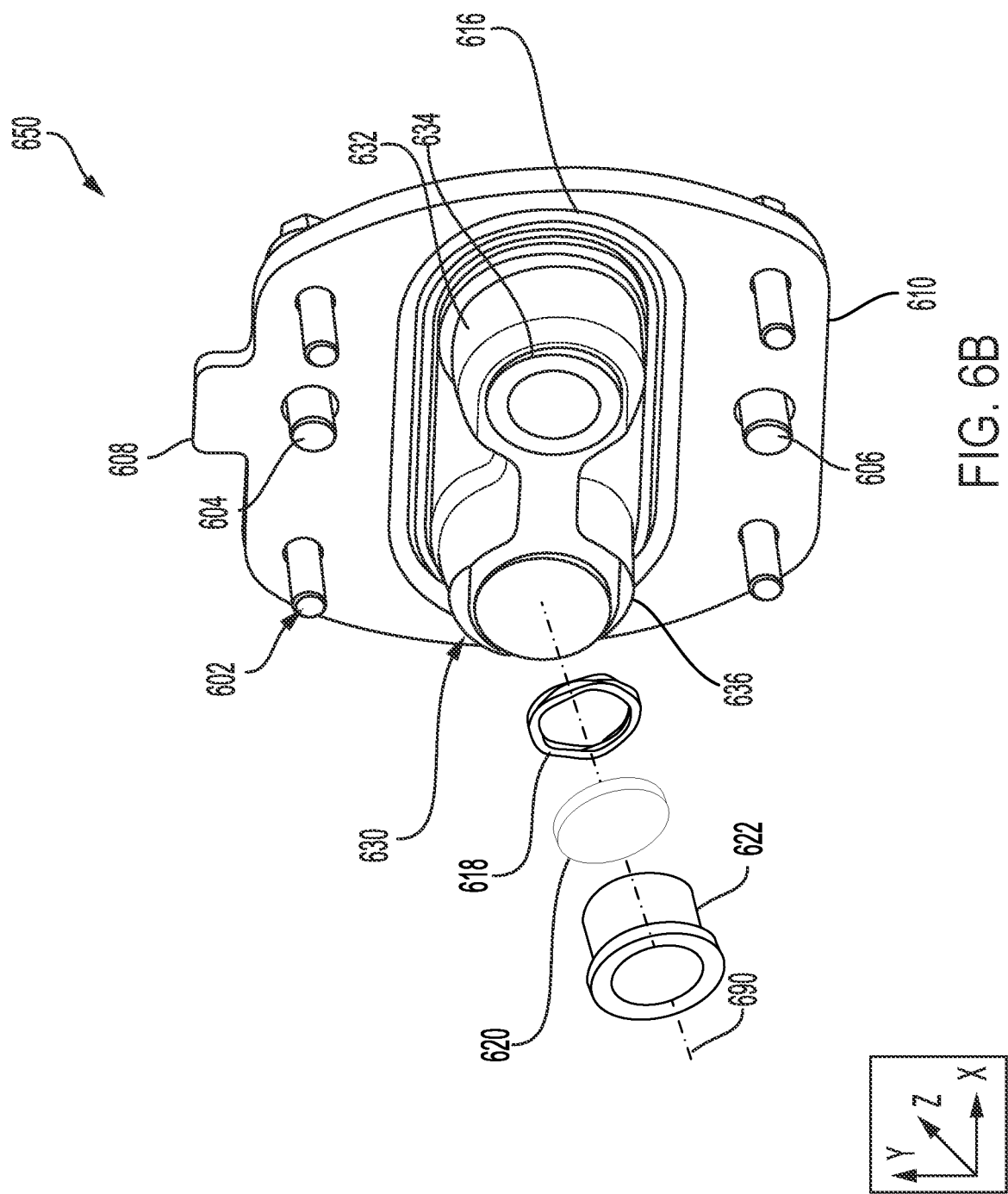
FIG. 6B shows an exploded view of the cover, the spring, the washer, and the bushing.

The following description relates to systems for an all-electric or partially electric vehicle, as shown in FIG. 1. The vehicle may include a transmission housing including a transmission, a fork, and a cover. FIG. 2A shows an example of the fork. FIG. 2B shows an example of a tip of a pivot point at a second extreme end of a tubular section of the fork. FIG. 3 shows a cover configured to couple to the transmission housing and the fork. FIG. 4 shows a section view of the fork arranged in the transmission housing. FIG. 5 shows an isometric view of the assembly including the transmission housing, the cover, and the fork. FIG. 6A shows a side view of the cover including a bushing, a washer, and a spring arranged therein. FIG. 6B shows an exploded view of the cover, the spring, the washer, and the bushing contained therein.

FIGS. 1-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-6B are shown approximately to scale, however, other dimensions may be used.

In one example, the systems disclosed herein provide a transmission housing comprising two shift forks mounted therein via two covers. The covers may include bushings coupled to opposite ends of the two shift forks. For example, a first cover may include a first bushing coupled to a first end of a first shift fork and a second cover may include a second bushing coupled to a second end of the first shift fork, the second end opposite the first end. A spring or other resilient member may be coupled to one of the first bushing or the second bushing to press the first shift fork in a desired direction toward a corresponding position sensor. By doing this, a space between the position sensor and a position sensor target of the first shift fork may be reduced, which may decrease inaccuracies resulting from thermal expansion other factors. The second shift fork may be pushed in an opposite direction relative to the first shift fork, wherein a space between its position sensor and a position sensor target is reduced.

In one example, the covers and elements thereof, such as coupling elements, locating elements, and diameters of the bushings, may be different from one another such that a first cover of the covers may couple to only one cutout of the transmission housing and a second cover may couple to only another cutout of the transmission housing. By doing this, assembly of the transmission housing may be simplified, which may reduce a cost thereof.

FIG. 1 shows a schematic depiction of a vehicle system 6 that can derive propulsion power from an electric motor 54. Electric motor 54 receives electrical power from a traction battery 58 to provide torque to rear vehicle wheels 55. Electric motor 54 may also be operated as a generator to provide electrical power to charge traction battery 58, for example, during a braking operation. It should be appreciated that while FIG. 1 depicts an electric motor 54 mounted in a rear wheel drive configuration, other configurations are possible, such as employing electric motor 54 in a front wheel configuration, or in a configuration in which there is an electric motor mounted to both the rear vehicle wheels 55 and front vehicle wheels 56.

Electric motor 54 may include a gearbox integrated therein (to be described further herein). Additionally or alternatively, the electric motor 54 may be coupled to an outside of a transmission/gearbox housing. The integrated gearbox may include a differential and a planetary gear set for transmitting power from the electric motor 54 to the rear vehicle wheels 55. Electric motor 54 may also include at least one clutch. Controller 112 may send a signal to an actuator of the clutch to engage or disengage the clutch, so as to couple or decouple power transmission from the electric motor 54 to the rear vehicle wheels 55 or the front vehicle wheels 56. Additionally or alternatively, there may be multiple traction batteries configured to provide power to different driven wheels, wherein power to the wheels may be predicated based on traction at the wheels, driver demand, and other conditions. In one example, the vehicle system 6 includes an all-wheel drive vehicle system.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Turning now to FIG. 2A, it shows a schematic of a shift fork 200. In one example, the shift fork 200 is one of a plurality of shift forks. The plurality of shift forks may include exactly two forks. The forks may be arranged in a transmission housing, such as a transmission housing within electric motor 54 of FIG. 1.

An axis system is shown including three axes, namely an x-axis, a y-axis, and a z-axis. The x-axis may be parallel to a horizontal direction, the y-axis parallel to a vertical axis, and the z-axis normal to each of the x- and y-axes.

The shift fork 200 may be a single piece. The shift fork 200 may include one or more materials including aluminum, steel, carbon fiber, cast iron, or other material. The shift fork 200 may include a body 210. The body 210 may comprise an actuator guide 220, a shaft 230, a position sensor target 240, and a synchro guide 250.

The body 210 may include a tubular section 212 extending in a direction parallel to the x-axis. The tubular section 212 may comprise a circular cross-section taken along a y-z plane. The tubular section 212 may comprise a uniform diameter along its length measured along the x-axis. The shaft 230 may extend through an entire body of the tubular section 212. In one example, pivot points (e.g., extreme ends) of the shaft 230 may protrude beyond a profile of the tubular section. The pivot points may include a first pivot point 232 at a first extreme end of the tubular section 212 and a second pivot point 234 that includes a tip 238 at a second extreme end of the tubular section 212, the second extreme end opposite the first extreme end. FIG. 2B includes a detailed view 201 showing the second pivot point 234 and the tip 238 in greater detail. In this way, the shaft 230 may be a pivotable shaft. In some examples, the first pivot point 232 may have a first diameter, while the second pivot point 234 may have a second diameter. In one example, the first diameter may be different than the second diameter. In some examples, additionally or alternatively, the first diameter may be equal to the second diameter. In one example, the second diameter is less than the first diameter.

The actuator guide 220 may be coupled to tubular section 212 at a location proximal to the first pivot point 232. Thus, the actuator guide 220 may be arranged closer to the first pivot point 232 than the second pivot point 234. The second pivot point 234 may further include a tip 238 arranged along an axis 290 parallel to the tubular section 212. The tip may optionally include a radius smaller than the radius of each of the tubular section 212 and the second pivot point 234. The actuator guide 220 may comprise a guide body 222. The guide body 222 may extend directly from the tubular section 212 in a direction parallel to the y-axis. The guide body 222 may include a y-shape, wherein the guide body 222 may include a first arm guide 224 and a second arm guide 226. Each of the first arm guide 224 and the second arm guide 226 may include an opening through which an actuator may extend. The opening of each of the first arm guide 224 and the second arm guide 226 may be centered along a common axis 228. The actuator is illustrated in FIG. 4.

The synchro guide 250 may extend from a portion of the tubular section 212 between the first pivot point 232 and the second pivot point 234. The synchro guide 250 may include a horseshoe shape. Additionally or alternatively, the synchro guide 250 may include a C-shape. The synchro guide may include a first synchro guide arm 252 and a second synchro guide arm 254. The first synchro guide arm 252 and the second synchro guide arm 254 may be arranged at opposite extreme ends of the synchro guide. The first synchro guide arm 252 may be arranged at a first extreme end and the second synchro guide arm 254 may be arranged at a second extreme end.

The synchro guide 250 may include an arch 256 that extends from the first synchro guide arm 252 and the second synchro guide arm 254. The arch 256 may extend through the tubular section 212. More specifically, the arch 256 may extend through an entire width of the tubular section 212 measured along the y-axis. The arch 256 may be asymmetric. A first arch arm 257 may include a first triangular cross-sectional shape taken along the x-y plane. A second arch arm 258 may include a second triangular cross-sectional shape taken along the x-y plane. The second triangular cross-sectional shape may be smaller than the first triangular cross-sectional shape. Furthermore, the second arch arm 258 may include a curvature adjacent to the tubular section 212 on a second pivot point 234 side of the tubular section 212. The first arch arm 257 may include a linear portion adjacent to the tubular section 212 on a first pivot point 232 side of the tubular section 212.

The first synchro guide arm 252 and the second synchro guide arm 254 may each include an opening arranged along a common axis 259. A synchro may couple to the openings of the first and second synchro guide arms 252, 254.

The position sensor target 240 may be coupled to the first synchro guide arm 252. The position sensor target 240 may extend from a portion of the first synchro guide arm 252 closer to the opening than to the tubular section 212.

Turning now to FIG. 3, it shows an embodiment of a cover 300. The cover 300 may be configured to facilitate assembly of the fork (e.g., shift fork 200 of FIG. 2A) into a transmission housing, such as transmission housing 402 of FIGS. 4 and 5. The cover 300 may fit into a window and/or an opening of the transmission housing. In one example, the transmission housing comprises a first cut-out on a first side and a second cut-out on a second side. The cover 300 may sealingly engage with one of the first cut-out or the second cut-out. As such, the cover 300 may be one of a plurality of covers configured to support one or more shift forks in the transmission housing.

The cover 300 may include a plurality of fasteners 302. The plurality of fasteners 302 may be smooth, threaded, or a combination thereof. The plurality of fasteners 302 may couple to a corresponding opening of the housing that may comprise complementary features for engaging with the plurality of fasteners 302.

The cover 300 may further include a first locating element 304 and a second locating element 306. The first locating element 304 may be arranged between a first adjacent pair of the plurality of fasteners 302 and the second locating element 306 may be arranged between a second adjacent pair of the plurality of fasteners 302 different than the first. The first locating element 304 and the second locating element 306 may be dowels arranged on along a common axis 390. The first locating element 304 and the second locating element 306 may insert into a corresponding opening of the transmission housing. The cover 300 may hold in place via the locating elements as a user tightens the plurality of fasteners 302. This may simplify a manufacturing process and reduce degradation of the fasteners and the housing. Furthermore, the locating elements may orient the cover 300 to a desired position, wherein the desired position may be based on a desired orientation and location of the shift fork. In some examples, the first locating element 304 and the second locating element 306 may include different diameters. In other examples, the first locating element 304 and the second locating element 306 are arranged in non-symmetrical positions (e.g., positions that result in the cover 300 being asymmetric) that force the cover 300 to be coupled to the transmission housing in a specific location and orientation. The corresponding openings of the transmission housing include diameters to match the different diameters of the first locating element 304 and the second locating element 306. By doing this, the cover 300 may be coupled into a desired orientation.

The cover 300 may further include a tab 308. The tab 308 may protrude from a body of the cover 300. In one example, the body of the cover 300 may include two linear sides opposite one another and coupled to two curved sides. The tab 308 may extend from one of the two linear sides. In one example, the tab 308 extends from the linear side nearest to the first locating element 304. The plurality of fasteners 302 may be positioned adjacent to corners where the linear sides and the curved sides intersect. In some examples, additionally or alternatively, the tab 308 may be a first tab, wherein the cover 300 may further include a second tab proximal to the second locating element 306. Additionally or alternatively, the tab 308 may be omitted in some examples and the cover 300 may be rotationally symmetric.

The cover 300 may further include an O-ring 316 configured to seal the opening of the transmission housing. The O-ring 316 may include a compressible material that forms a seal against a surface of the transmission housing when the cover 300 is physically coupled to the transmission housing.

The cover 300 may include a plurality of supports 320 including a first protrusion 322 and a second protrusion 326. The first protrusion 322 and the second protrusion 326 may be surrounded by the O-ring 316 and located between the first locating element 304 and the second locating element 306. The plurality of supports 320 may protrude from a body of the cover 300 toward an interior of the transmission housing, as shown in FIGS. 4 and 5. The first protrusion 322 may receive a first bushing 324 and the second protrusion 326 may receive a second bushing 328. In one example, the first protrusion 322 is identical to the second protrusion 326 in one or more of size and shape. In some examples, the first bushing 324 may be different than the second bushing 328 with regard to a diameter thereof. For example, the first bushing 324 may include a first diameter and the second bushing 328 may include a second diameter, larger or smaller than the first diameter. In one example, when the cover 300 is coupled to the transmission housing, the first bushing 324 may receive a first end of a first shift fork and the second bushing may receive a second end of a second shift fork, wherein the first and second ends comprise different diameters. Coupling between the shift forks and the cover is described in greater detail below with respect to FIG. 4.

In some examples, additionally or alternatively, at least one of the first protrusion 322 or the second protrusion 326 may include a biasing element, such as a spring, configured to press the shift fork to a desired side of the transmission housing. In one example, the biasing element may be positioned into one of the plurality of supports 320 configured to receive an extreme end opposite a position sensor target (e.g., second pivot end 234 opposite the position sensor target 240 of FIG. 2A). By doing this, an air gap between the position sensor target and the position sensor may be minimized, resulting in improved sensing of the shift fork position regardless of part variance due to manufacturing process or changes in temperature.

Turning to FIG. 6A, it shows a side view 600 of a cover 610. In one example, the cover 610 may be identical to the cover 300 of FIG. 3. Additionally or alternatively, the cover 610 may be a mirrored embodiment of the cover 300. Herein, the cover 300 is a first cover 300 and the cover 610 is a second cover 610.

The second cover 610 may include first locating element 604 and a second locating element 606. The second cover 610 may include at least one protrusion 609. The protrusion 609 may include a bushing 622, a washer 620, and a spring 618 inserted therein. In one example, the spring 618 may be inserted into the protrusion 609 first, followed by the washer 620 and then the bushing 622. The spring 618 may apply a force in a direction away from the second cover 610 toward to the bushing 622. In one example, the spring 618 presses the washer 620 toward the bushing 622, and therefore into an end of a shift fork interacting with the bushing 622 so that the washer 620 and fork are in continuous contact. In one example, the washer 620 is pressed against a tip (e.g., tip 238 of FIG. 2A) of the fork.

Turning now to FIG. 6B, it shows an exploded view 650 of the second cover 610. As such, components previously introduced are similarly numbered in this figure and subsequent figures. The exploded view 650 of the second cover 610 further shows a plurality of fasteners 602, the first locating element 604, the second locating element 606, a tab 608, an O-ring 616, and a plurality of supports 630, which may be identical to the first locating element 304, the second locating element 306, the tab 308 the O-ring 316, and the plurality of supports 320 of the first cover 300 of FIG. 3, respectively. The plurality of fasteners 602 may physically couple to corresponding openings of a transmission housing adjacent to a cutout such that the second cover 610 may be physically coupled to the transmission housing.

The plurality of supports 630 may include a third protrusion 632 and a fourth protrusion 636. The third protrusion 632 may include a third bushing 622. In one example, the third bushing 622 may be identical to the second bushing 328 inserted into the second protrusion 326 of the first cover 300 of FIG. 3.

The fourth protrusion 636 may include one or more of the spring 618, the washer 620, and the bushing 622. Herein, the bushing 622 is referred to as the fourth bushing 622. In some examples, additionally or alternatively, the fourth bushing 622 may act as a retainer and capture the spring 618 and the washer 620 when inserted (e.g., press fit) into the fourth protrusion 636 such that the spring 618 and the washer 620 are contained during handling of the cover 610. The fourth bushing 622 may be identical to the first bushing 324 of the first protrusion 322 of FIG. 3. Thus, the diameters of the openings of the third bushing 634 and the fourth bushing 622 may be different, wherein the fourth bushing 622 may include a smaller opening than the third bushing 634. The bushing 622, the washer 620, and the spring 618 may be arranged along an axis 690, and may fit into the opening of the third protrusion 632. The axis 690 may be arranged along, or parallel to, the z-axis.

Turning now to FIG. 4, it shows a cross-sectional view 400 of a transmission housing 402 taken in an X-Y plane, revealing a first shift fork 412 and a second shift fork 414. A view 500 of the transmission housing 402 with only the electric motor omitted, exposing a transmission housing opening 506 is shown in FIG. 5. The first cover 300 and the second cover 610 are coupled to the transmission housing 402. The first cover 300 is arranged on a first side of the transmission housing 402 and the second cover 610 is arranged on a second side of the transmission housing 402. The second side may be opposite the first side along the x-axis. A first cut-out 405 may be arranged on the first side and a second cut-out 407 may be arranged on the second side. A distance between the first cut-out 405 and the second cut-out 407 may be equal to or slightly larger than the lengths of the shafts of the first shift fork 412 and the second shift fork 414, which may be identical to the shift fork 200 of FIG. 2A. In some examples, additionally or alternatively, one or more components of the first shift fork 412 and the second shift fork 414 may differ while the length of the shafts and diameters of the ends of the shafts may be identical. The first cover 300 and the second cover 610 may be removable and accessible from an exterior of the transmission housing 402.

A first actuator 422 is shown coupled to an actuator guide 420 of the first shift fork 412. A second actuator 424 is shown coupled to an actuator guide 421 of the second shift fork 414.

A first synchro 432 is shown coupled to a synchro guide 430 of the first shift fork 412. A second synchro 434 is shown coupled to an actuator guide 431 of the second shift fork 414.

The transmission housing 402 may include two position sensor ports including a first position sensor port 442 and a second position sensor port 444. The first position sensor port 442 may include a first position sensor 446 interfacing with a first position sensor target 447 of the first shift fork 412. The second position sensor port 444 may include a second position sensor 448 interfacing with a second position sensor target 449 of the second shift fork 414.

The first cover 300 and the second cover 610 may be coupled to the first shift fork 412 and the second shift fork 414. The first protrusion 322 of the first cover 300 may include a spring, a washer, and a bushing identical to the spring 618, the washer 620, and the bushing 622 of the second cover 610 of FIGS. 6A and 6B, respectively. Herein the spring, washer, and bushing of the first cover 300 are referred to as a first spring, a first washer, and a first bushing and the springs 618, the washer 620, and the bushing 622 of the second cover 610 are referred to as a second spring, a second washer, and a second bushing, respectively. The first spring presses the first washer against a tip of a second pivot end of the second shift fork 414. The second spring presses the second washer against a tip of a second pivot end of the first shift fork 412. In one example, the tip of the second shift fork 414 is engaged with the first cover 300 and the tip of the first shift fork 412 is engaged with the second cover 610, wherein the engagement pushes the shift forks in a direction away from a respective cover. The tips may include a diameter that is less than a diameter of the washer. For example, the tip of the second shift fork 414 may include a diameter equal to approximately half the diameter of the first washer. By doing this, friction may block motion between the first spring and the first washer and allows relative movement between the washer and the tip. The second pivot end is opposite the first pivot end and distal to the second position sensor target 449. The first spring 418 may press the second shift fork 414 closer to the second position sensor port 444 in a first direction 498, where a position sensor is located, to minimize an air gap therebetween. Thus, an air gap between the second shift fork 414 and the first side of the transmission housing 402 may increase. Additionally, the third protrusion 632 may be free of a spring or other resilient member such that only the third bushing 634 is arranged therein. By doing this, the position sensor may provide more accurate feedback to a controller. Furthermore, the first bushing 324, which is press fit into the first protrusion 322, may maintain the spring 418, and washer, if included, therein. This may increase an efficiency and decrease a complexity of routine maintenance performed on the transmission.

The second cover 610 may include the spring 618 of FIG. 6B, herein, referred to as the second spring 618. The second spring 618 may be arranged in the fourth protrusion (e.g., fourth protrusion 636 of FIG. 6B), obstructed from view by the third protrusion 632 in the example of FIG. 4. The second spring 618 may press against the second pivot end of the first shift fork 412 and press the first shift fork 412 in a second direction 499, opposite the first direction 498. The first shift fork 412 may be coupled to each of the fourth protrusion 636 of the second cover 610 and the second protrusion 326 of the first cover 300.

As illustrated, the first protrusion 322 and the third protrusion 632 may be aligned along a first axis 492 parallel to the x-axis. The second protrusion (e.g., the second protrusion 326 of FIG. 3), which is obstructed from view by the first protrusion 322 and the second shift fork 414, may be aligned with the fourth protrusion along a second axis parallel to each of the x-axis and the first axis 492. In one example, the first axis 492 and the second axis are misaligned with one another.

In the view 500 of FIG. 5, the transmission housing opening 506 is surrounded by a plurality of fasteners 504. The plurality of fasteners 504 may be configured to mount an electric motor to the transmission housing 402. The opening 506 may include a diameter that is less than the length of the shift forks. The diameter may also be less than the distance between the cut-outs arranged in the transmission housing 402 in which the covers are arranged.

In this way, each of the first shift fork and the second shift fork may be forced toward respective position sensors via a single spring. The covers may be configured to match a corresponding cutout of the transmission housing 402 so that each of the shift forks is pressed in a desired direction. For example, the locating elements (e.g., housing dowels) and bolt holes that locate the covers to the cutouts of the transmission housing 402 may be different. As another example, additionally or alternatively, inner and outer diameters of the bushing that is coupled to the spring may be different than the inner and outer diameters of the bushing that is free of the spring. These differences may promote accurate assembly and block the forks from being installed in an undesired location and/or orientation.

In one example, a method of manufacture may include coupling the transmission cover to the transmission housing. A first shift fork may be positioned through the opening of the transmission cover. Pivot points of the first shift fork may be positioned proximally to openings corresponding to where the covers will be positioned. The second shift fork may be positioned through the opening of the transmission cover. Pivot points of the second shift fork may be positioned proximally to the openings corresponding to where the covers will be positioned. Pivot points of the shift forks may be inserted into bushings of a first cover and the first cover may be positioned at one of the openings and physically coupled to the transmission housing. The pivot points at opposite extreme ends of the shift forks may be inserted into bushings of a second cover. The second cover may then be physically coupled to the transmission housing. By doing this, installation of a large, single piece fork is achieved, wherein the large single piece fork comprises a shaft length larger than the opening and a width of the transmission. However, by including the covers as a separate piece to which the forks may be coupled, the installation of the forks as a single-piece is achieved and simplified. Furthermore, installation and replacement of the bushings of the covers may be relatively fast via being accessible from an exterior of the transmission. Additionally, the spacing between the shift forks may allow a single cover to include two bushings configured to support and locate pivot points of the two shift forks, while pressing each of the shift forks in desired directions to increase a position sensor accuracy by reducing endplay and thermal expansion near the position sensor. By doing this, both shift forks may be supported by only two covers comprising a total of four bushings. The technical effect of the covers is to allow installation of a large, single piece shift fork into a transmission housing while decreasing a system complexity and manufacture.

The disclosure provides support for a system including a transmission housing comprising at least one cover configured to support a shift fork, wherein the at least one cover comprises at least one spring inserted into a protrusion of the at least one cover and pressing against an extreme end of the shift fork. A first example of the system further includes where the at least one cover is a first cover and the at least one spring is a first spring, the transmission housing further comprising a second cover including a protrusion free of a spring. A second example of the system, optionally including the first example, further includes where the first cover and the second cover support opposite ends of the shift fork, and wherein the protrusion of the first cover comprises a first bushing with a first diameter and the protrusion of the second cover comprises a second bushing with a second diameter different than the first diameter. A third example of the system, optionally including one or more of the previous examples, further includes where the first cover supports a first pivot point at the extreme end of the shift fork via the first bushing and the second cover supports a second pivot point at an opposite extreme end of the shift fork via the second bushing. A fourth example of the system, optionally including one or more of the previous examples, further includes where the shift fork comprises a length greater than a diameter of an opening of a transmission housing. A fifth example of the system, optionally including one or more of the previous examples, further includes where the shift fork is a single piece and comprises a position sensor target, and wherein the at least one spring presses the shift fork toward a position sensor arranged in the transmission housing.

The disclosure further provides support for a system for a transmission housing of a vehicle, comprising a first shift fork and a second shift fork arranged within the transmission housing, and a first cover arranged at a first side of the transmission housing and a second cover arranged at a second side of the transmission housing, the second side opposite the first, wherein the first cover and the second cover comprise a plurality of protrusions with bushings arranged therein, the first cover comprises a first protrusion and a second protrusion, the first protrusion comprising a first bushing and the second protrusion comprising a second bushing, the first protrusion further comprising a first spring, the second cover comprises a third protrusion and a fourth protrusion, the third protrusion comprising a third bushing and the fourth protrusion comprising a fourth bushing, the fourth protrusion further comprising a second spring. A first example of the system further includes where the first spring presses against a second pivot point of the first shift fork, a first pivot point of the first shift fork coupled to the third bushing. A second example of the system, optionally including the first example, further includes where the second spring presses against a second pivot point of the second shift fork, a first pivot point of the second shift fork coupled to the second bushing. A third example of the system, optionally including one or more of the previous examples, further includes where the first spring presses the first shift fork in a first direction and the second spring presses the second shift fork in a second direction, opposite the first direction. A fourth example of the system, optionally including one or more of the previous examples, further includes where the first direction and the second direction are parallel to one another. A fifth example of the system, optionally including one or more of the previous examples, further includes where the first protrusion and the third protrusion are aligned along a first axis, and wherein the second protrusion and the third protrusion are aligned along a second axis, the first axis parallel to the second axis. A sixth example of the system, optionally including one or more of the previous examples, further includes where the first cover and the second cover comprise a locating element configured to engage with a feature of the transmission housing and retain the first cover and the second cover to the transmission housing without a plurality of fasteners. A seventh example of the system, optionally including one or more of the previous examples, further includes where a first position sensor coupled to a position sensor target of the first shift fork and a second position sensor coupled to a position sensor target of the second shift fork. An eighth example of the system, optionally including one or more of the previous examples, further includes where the first cover and the second cover are identical in size and shape, and wherein the first cover and the second cover are removable and separate from the transmission housing.

The disclosure further provides support for a housing including an opening including a diameter, a first shift fork arranged within the housing, the first shift fork comprising a length greater than the diameter, the length measured along a shaft of the first shift fork, a second shift fork arranged within the housing, the second shift fork comprising a length greater than the diameter, the length measured along a shaft of the second shift fork, and a first cover arranged at a first side opening of the housing and a second cover arranged at a second side opening of the housing, a distance between the first side opening and the second side opening being greater than the length of the shaft of the first shift fork and the second shift fork, wherein the first cover comprises a first spring configured to push the first shift fork in a first direction and the second cover comprises a second spring configured to push the second shift fork in a second direction opposite the first direction. A first example of the housing, further includes where the first spring is coupled to a first bushing arranged in a first protrusion of the first cover, the first cover further comprising a second protrusion, and wherein only a second bushing is arranged in the second protrusion. A second example of the housing, optionally including the first example, further includes where the second cover comprises a third protrusion comprising a third bushing and a fourth protrusion comprising a fourth bushing, wherein the second spring is coupled to the fourth bushing. A third example of the housing, optionally including one or more of the previous examples, further includes where the first protrusion and the third protrusion are aligned along a first axis and coupled to opposite ends of the first shift fork. A fourth example of the housing, optionally including one or more of the previous examples, further includes where the second protrusion and the fourth protrusion are aligned along a second axis, parallel to and misaligned with the first axis, and coupled to opposite ends of the second shift fork.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a transmission housing;
   a first cover configured to support a shift fork and physically couple to the transmission housing, and a first spring and a first washer inserted into a protrusion of the first cover and pressing against an extreme end of the shift fork, wherein the first cover is separate and removable from the transmission housing; and
   a second cover including a protrusion free of both a spring and a washer, wherein the second cover is separate and removable from the transmission housing;
   wherein the first cover and the second cover support opposite ends of the shift fork, and wherein a first bushing with a first diameter is arranged in the protrusion of the first cover and a second bushing with a second diameter, different than the first diameter, is arranged in the protrusion of the second cover.

2. The system of claim 1, wherein the first cover supports a first pivot point at the extreme end of the shift fork via the first bushing and the second cover supports a second pivot point at an opposite extreme end of the shift fork via the second bushing.

3. The system of claim 1, wherein the shift fork comprises a length greater than a diameter of an opening of a transmission housing.

4. The system of claim 1, wherein the shift fork is a single piece and comprises a position sensor target, and wherein the first spring presses the shift fork toward a position sensor arranged in the transmission housing.

5. A system for a vehicle, comprising:
   a transmission housing;
   a first shift fork and a second shift fork arranged within the transmission housing; and
   a first cover arranged at a first side of the transmission housing and a second cover arranged at a second side of the transmission housing, the second side opposite the first; wherein
   the first cover and the second cover comprise a plurality of protrusions with bushings arranged therein,
   the first cover comprises a first protrusion and a second protrusion of the plurality of protrusions, a first bushing arranged in the first protrusion and a second bushing arranged in the second protrusion, and further comprising a first spring arranged in the first protrusion;
   the second cover comprises a third protrusion and a fourth protrusion of the plurality of protrusions, a third bushing arranged in the third protrusion and a fourth bushing arranged in the fourth protrusion, and further comprising a second spring arranged in the fourth protrusion; and
   the first cover and the second cover are removable and separate from the transmission housing.

6. The system of claim 5, wherein the first spring presses a first washer against a tip at a second pivot point of the first shift fork, and wherein a first pivot point of the first shift fork is coupled to the third bushing.

7. The system of claim 6, wherein the second spring presses a second washer against a tip at a second pivot point of the second shift fork, and wherein a first pivot point of the second shift fork is coupled to the second bushing.

8. The system of claim 5, wherein the first spring and a first washer press the first shift fork in a first direction and the second spring presses the second shift fork in a second direction, opposite the first direction.

9. The system of claim 8, wherein the first direction and the second direction are parallel to one another.

10. The system of claim 5, wherein the first protrusion and the third protrusion are aligned along a first axis, and wherein the second protrusion and the third protrusion are aligned along a second axis, the first axis parallel to the second axis.

11. The system of claim 5, wherein the first cover and the second cover each comprise a locating element configured to engage with a feature of the transmission housing and retain the first cover and the second cover to the transmission housing.

12. The system of claim 5, further comprising a first position sensor coupled to a position sensor target of the first shift fork and a second position sensor coupled to a position sensor target of the second shift fork.

13. The system of claim 5, wherein the first cover and the second cover are identical in size and shape.

14. A transmission, comprising:
a housing comprising a main opening including a diameter;
a first shift fork arranged within the housing, the first shift fork comprising a length greater than the diameter, the length measured along a shaft of the first shift fork;
a second shift fork arranged within the housing, the second shift fork comprising a length greater than the diameter, the length measured along a shaft of the second shift fork; and
a first cover arranged at a first side opening of the housing and a second cover arranged at a second side opening of the housing, a distance between the first side opening and the second side opening being greater than the length of the shaft of the first shift fork and the second shift fork, wherein a first spring is coupled to the first cover and configured to push the first shift fork in a first direction and a second spring is coupled to the second cover and configured to push the second shift fork in a second direction opposite the first direction.

15. The transmission of claim 14, wherein the first spring is coupled to a first bushing arranged in a first protrusion of the first cover, the first cover further comprising a second protrusion, and wherein a second bushing is arranged in the second protrusion.

16. The transmission of claim 15, wherein the second cover comprises a third protrusion and a fourth protrusion, wherein a third bushing is arranged in the third protrusion and a fourth bushing is arranged in the fourth protrusion, and wherein the second spring is coupled to the fourth bushing.

17. The transmission of claim 16, wherein the first protrusion and the third protrusion are aligned along a first axis and coupled to opposite ends of the first shift fork.

18. The transmission of claim 17, wherein the second protrusion and the fourth protrusion are aligned along a second axis, parallel to and misaligned with the first axis, and coupled to opposite ends of the second shift fork.

* * * * *